United States Patent
Cornelius (10) Patent No.: US 7,668,244 B2
(45) Date of Patent: Feb. 23, 2010

(54) METHOD AND APPARATUS FOR INCREASING DATA TRANSFER RATES THROUGH A COMMUNICATION CHANNEL

(75) Inventor: William P. Cornelius, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 738 days.

(21) Appl. No.: 11/172,332

(22) Filed: Jun. 29, 2005

(65) Prior Publication Data

US 2007/0002970 A1 Jan. 4, 2007

(51) Int. Cl.
*H04B 14/04* (2006.01)
(52) U.S. Cl. ...................................... 375/253
(58) Field of Classification Search ............... 375/259, 375/285, 295, 316, 340, 342–343, 360, 246, 375/253; 327/50, 63, 77
See application file for complete search history.

(56) References Cited

U.S. PATENT DOCUMENTS

| | | | | |
|---|---|---|---|---|
| 3,883,687 A | | 5/1975 | Stenstrom | ................... 178/69.5 |
| 4,620,311 A | | 10/1986 | Schouhamer Immink | .... 375/19 |
| 5,701,302 A | * | 12/1997 | Geiger | ........................ 370/521 |
| 6,047,026 A | | 4/2000 | Chao et al. | ................... 375/233 |
| 6,278,754 B1 | * | 8/2001 | Thomas et al. | .............. 375/360 |
| 6,437,710 B1 | | 8/2002 | Tam et al. | ...................... 341/58 |
| 6,600,432 B2 | * | 7/2003 | Green | .......................... 341/67 |
| 6,975,618 B1 | * | 12/2005 | Smith et al. | ................. 370/350 |
| 7,409,031 B1 | * | 8/2008 | Lee et al. | ..................... 375/376 |
| 2003/0053574 A1 | * | 3/2003 | Cohen et al. | ................ 375/355 |
| 2005/0117668 A1 | | 6/2005 | Tang et al. | ................... 375/324 |
| 2005/0132112 A1 | * | 6/2005 | Pawlowski | ................... 710/110 |

* cited by examiner

*Primary Examiner*—Khanh C Tran
(74) *Attorney, Agent, or Firm*—Park, Vaughan & Fleming LLP (57) ABSTRACT

A system for receiving data on a communication channel. The system examines the state of a bit that was previously received on the channel. If the state of the previously received bit was high, the system looks for a falling edge while receiving a subsequent bit on the channel. Otherwise, the system looks for a rising edge while receiving the subsequent bit on the channel. While looking for a rising edge or looking for a falling edge, the system samples a signal on the channel at discrete time steps within a symbol interval, wherein the symbol interval is a time period during which the signal can change states. The specific discrete time step at which the signal changes state is associated with a specific decoded output symbol. Note that the signal can also convey information by not changing states. Also note that not all symbols require the same time to be transmitted, because some symbols can be associated with signal transitions that happen sooner, whereas other symbols can be associated with signal transitions that happen later.

21 Claims, 9 Drawing Sheets

FIG. 9 ns7668244# METHOD AND APPARATUS FOR INCREASING DATA TRANSFER RATES THROUGH A COMMUNICATION CHANNEL

BACKGROUND

1. Field of the Invention

The present invention relates to techniques for communicating data through a communication channel. More specifically, the present invention relates to a method and an apparatus for increasing a data transfer rate through a communication channel.

2. Related Art

Advances in semiconductor fabrication technology presently make it possible to integrate large-scale systems, including tens of millions of transistors, into a single semiconductor chip. Integrating such large-scale systems onto a single semiconductor chip enables increases in the frequency at which such systems can operate, because signals between system components do not have to cross chip boundaries, and are not subject to lengthy chip-to-chip propagation delays.

However, as the frequency of these systems increases, the communication channels used to transfer data between system components is becoming a bottleneck. This can cause the system to waste time waiting for data to arrive. One solution to this problem is to increase the frequency at which the signal is transmitted on the communication channel to allow more data to be sent through the communication channel per unit time. Unfortunately, the frequency of a signal cannot be increased indefinitely. In a typical lossy communication channel, as the signal frequency increases, the amplitude of the signal decreases. This makes the signal more vulnerable to noise. Differential signaling can be used to somewhat increase the bandwidth of lossy communication channels, but improvements gained through this technique are limited.

Figure 1A:
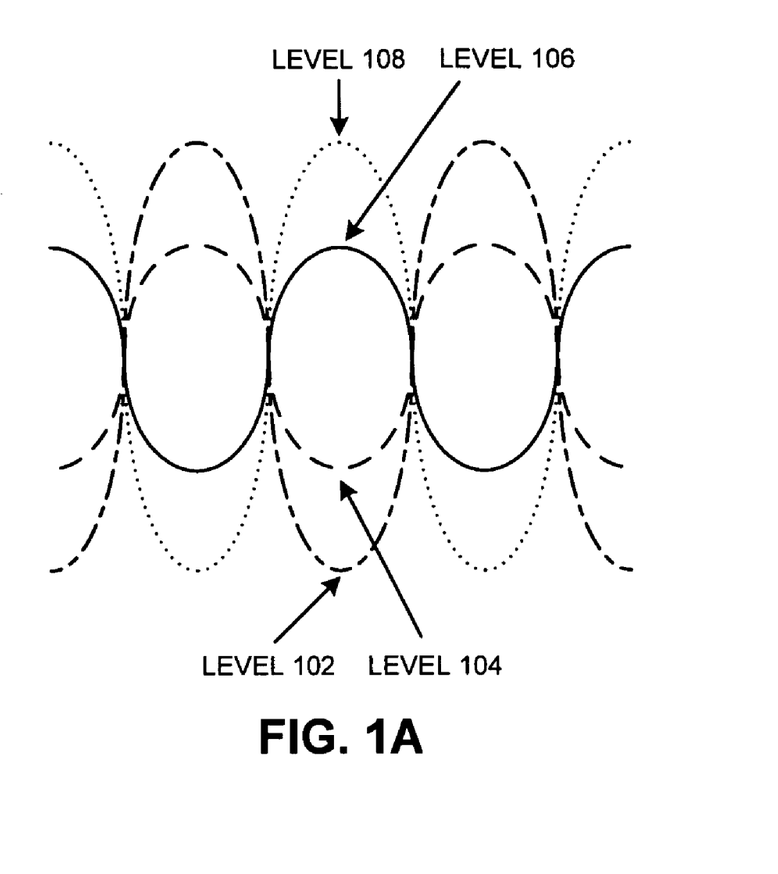
FIG. 1A presents a voltage-versus-time diagram of a four-level signaling scheme.

Another method to increase bandwidth is to use multi-level signaling, which increases the effective bandwidth by increasing the amount of data transferred in a given time unit. For example, FIG. 1A presents a voltage-versus-time diagram of a four-level signaling scheme. It illustrates four voltage levels, including level 102, level 204, level 106, and level 108. Since there are four distinct voltage levels in this four-level signaling scheme, each voltage level can convey two bits of data. Unfortunately, receivers are not good at distinguishing between multiple voltage levels, especially if there is any noise on the communication channel.

Hence, what is needed is a method and an apparatus for increasing the data transfer rate through a communication channel without the problems described above.

SUMMARY

One embodiment of the present invention provides a system for receiving data on a communication channel. The system examines the state of a bit that was previously received on the channel. If the state of the previously received bit was high, the system looks for a falling edge while receiving a subsequent bit on the channel. Otherwise, the system looks for a rising edge while receiving the subsequent bit on the channel.

In a variation on this embodiment, while looking for a rising edge, the system uses a different reference voltage (or threshold voltage) than while looking for a falling edge.

In a variation on this embodiment, while looking for a rising edge or looking for a falling edge, the system samples a signal on the channel at discrete time steps within a symbol interval, wherein the symbol interval is a time period during which the signal can change states. The specific discrete time step at which the signal changes state is associated with a specific encoded input which in turn is decoded. (Note that the signal can also convey information by not changing states. Also note that not all encoded inputs require the same time to be transmitted, because some encoded inputs are associated with signal transitions that happen sooner, whereas other encoded inputs are associated with signal transitions that happen later.)

In a variation on this embodiment, the output symbol is a bit pattern.

In a variation on this embodiment, in order to encode a signal, the system reads the state of a previously transmitted bit and reads a value to be encoded. If the state of the previously transmitted bit is high, the system uses an encoding table for the high state to select a discrete time step in a symbol interval which corresponds to the value to be encoded, and causes a transition from high-to-low or causes the signal to remain high at the selected discrete time step. Otherwise, if the state of the previously transmitted bit is low, the system uses an encoding table for the low state to select a discrete time step in the symbol interval which corresponds to the value to be encoded, and causes a transition from low-to-high at the selected time step or causes the signal to remain low.

In a variation on this embodiment, after causing a transition from high-to-low or a transition from low-to-high, the system may wait for a minimum switching period before causing a subsequent transition, whereby the variable latency of different bit patterns can be somewhat equalized.

In a variation on this embodiment, the system uses a variable-delay circuit to cause a transition from high-to-low or a transition from low to high at a selected discrete time step.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

Symbol Interval

Figure 1B:
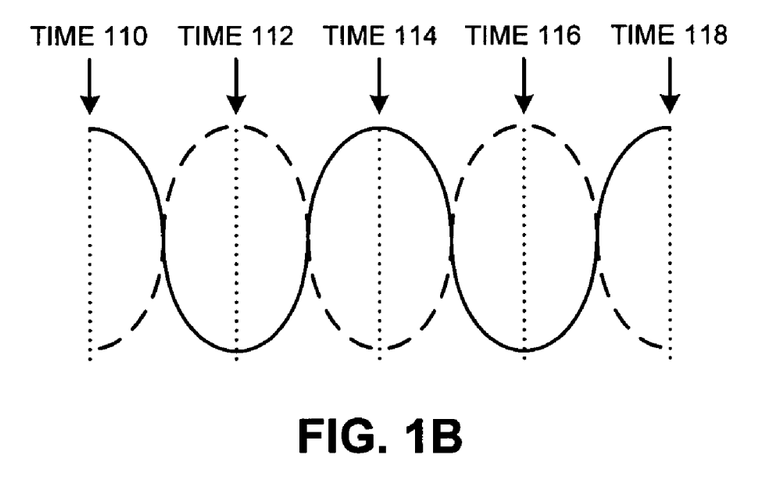
FIG. 1B presents a voltage-versus-time diagram of a two-level signaling scheme.

Traditionally, a receiver examines a signal at discrete time intervals. For example, FIG. 1B presents a voltage-versus-time diagram of a two-level signaling scheme. It illustrates sampling points at regular time intervals, including time 110, time 112, time 114, time 116, and time 118. At each sampling point, the receiver determines if it is receiving a high or low voltage level. The receiver can distinguish between two voltage levels accurately, but distinguishing between multiple voltage levels is significantly more difficult. On the other hand, digital logic is good at distinguishing between small time increments. Therefore, instead of increasing the amount of data per time unit by adding more voltage levels to a signal, data can be encoded within phase information for the signal.

While decoding the signal, the decoder stores the state of a previously received bit. If the state of the previously received bit was high, the decoder looks for a falling edge. If the state of the previously received bit was low, the decoder looks for a rising edge. These rising or falling edges can occur at any point during the symbol interval. Note that the signal not transitioning can also convey information.

Figure 2A:
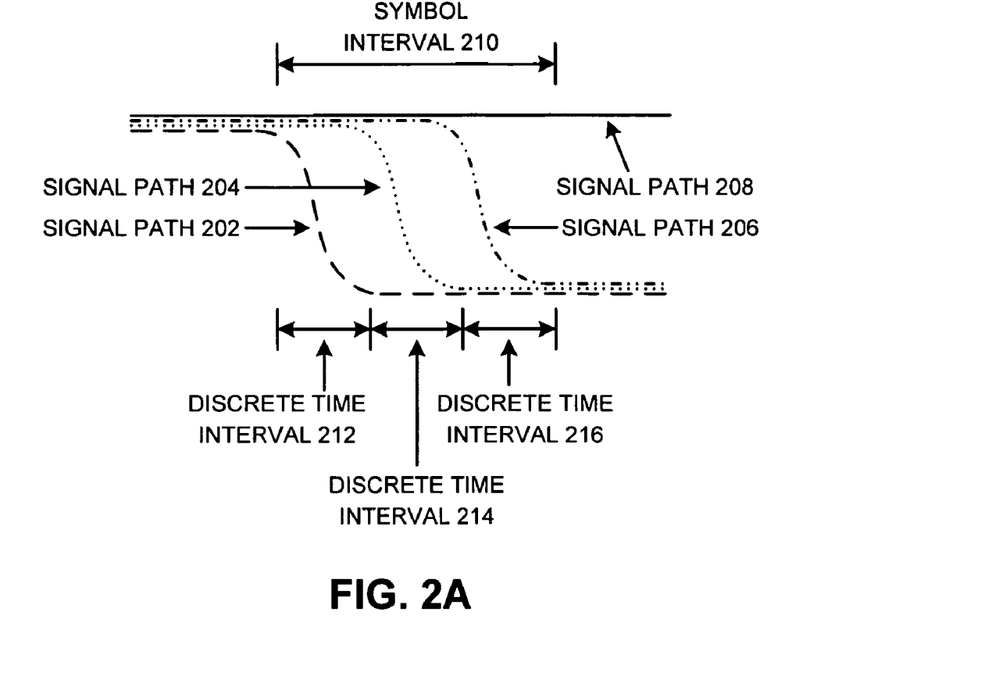
FIG. 2A presents a voltage-versus-time diagram for a falling edge transition in accordance with an embodiment of the present invention.

FIG. 2A presents a voltage-versus-time diagram of a falling edge transition in accordance with an embodiment of the present invention. It illustrates a number of possible signal paths and time intervals, including signal path 202, signal path 204, signal path 206, signal path 208, symbol interval 210, discrete time interval 212, discrete time interval 214, and discrete time interval 216. In this case, the previously received bit was high. Therefore, the decoder looks for a falling edge. There are four possible signal paths with falling edge transitions within symbol interval 210, which can be used to represent two bits of data. (1) The signal can transition to a low state within discrete time interval 212 by taking signal path 202. (2) It can transition to a low state within discrete time interval 214 by taking signal path 204. (3) It can transition to a low state within discrete time interval 216 by taking signal path 206. (4) Or, it can stay in a high state throughout symbol interval 210 by taking signal path 208. One possible two-bit encoding scheme assigns 00 to signal path 202, 01 to signal path 204, 10 to signal path 206, and 11 to signal path 208. Although, note that other encoding schemes can be used.

Figure 2B:
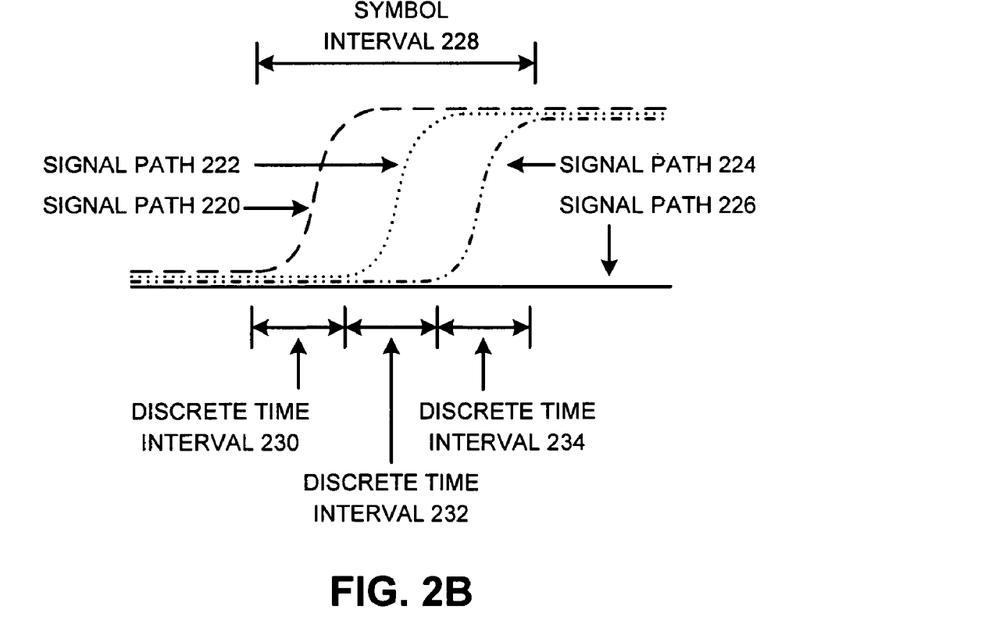
FIG. 2B presents a voltage-versus-time diagram for a rising edge transition in accordance with an embodiment of the present invention.

FIG. 2B presents a voltage-versus-time diagram for a rising edge transition in accordance with an embodiment of the present invention. It illustrates a number of time intervals and possible signal paths, including signal path 220, signal path 222, signal path 224, signal path 226, symbol interval 228, discrete time interval 230, discrete time interval 232, and discrete time interval 234. In the example which appears in FIG. 2B, the previously received bit was low. Therefore, the decoder looks for a rising edge. In FIG. 2B, there are four possible signal paths in symbol interval 228, which can be used to represent two bits of data. (1) The signal can transition to a high state within discrete time interval 230 by taking signal path 220. (2) It can transition to a high state within discrete time interval 232 by taking signal path 222. (2) It can transition to a high state within discrete time interval 234 by taking signal path 224. (4) Or, it can stay in a low state throughout symbol interval 228 by taking signal path 226. One possible two-bit encoding scheme assigns 00 to signal path 220, 01 to signal path 222, 10 to signal path 224, and 11 to signal path 226. Note that other encoding schemes can be used. Note that in FIG. 2B, the transitions are sharp. In band-limited channels, the edges may overlap considerably between discrete time intervals. The decoder is able to detect shifts in phase that are smaller than the rise/fall times.

Communication System

Figure 3:
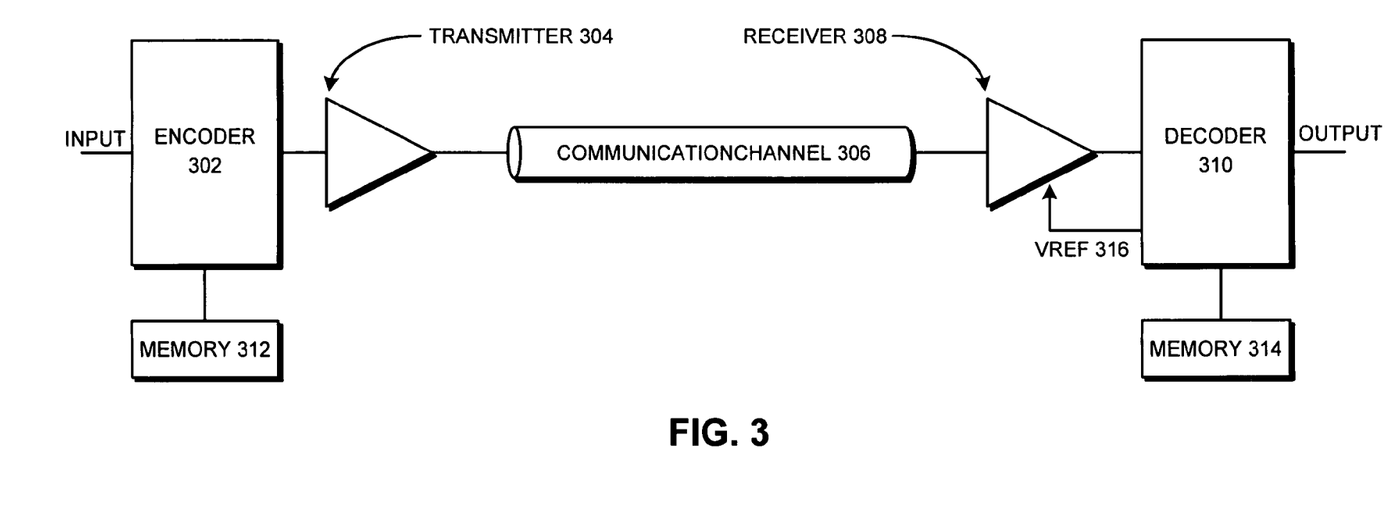
FIG. 3 presents a block diagram of a communication system in accordance with an embodiment of the present invention.

FIG. 3 presents a block diagram of a communication system in accordance with an embodiment of the present invention. It contains encoder 302, transmitter 304, communication channel 306, receiver 308, decoder 310, memory 312, memory 314, and reference voltage ($V_{ref}$) 316.

Encoder 302 uses the state of the previously transmitted bit stored in memory 312 to determine how to encode the data into the correct phase in the symbol interval. If the previously transmitted bit was high, then the encoder will cause a falling transition or will cause the signal to stay high. If the previously transmitted bit was low, then the encoder will cause a rising transition or will cause the signal to stay low. Transmitter 304 then transmits the encoded signal through communication channel 306. Receiver 308 receives the encoded signal and sends it to decoder 310 to decode restore the unencoded signal. Decoder 310 uses the state of the previously received bit stored in memory 314 to determine if it is looking for a rising edge or a falling edge. If the previously received bit was high, then the receiver and decoder look for a falling transition. If the previously received bit was low, then the receiver and decoder look for a rising transition. In other words, the receiver can see if an edge of known polarity occurs at any of the discrete time intervals in the symbol interval. Note that information can be conveyed whether or not the signal transitions from high-to-low or low-to-high. Each possible path is a state for the symbol. For instance, if the previously received bit was high, the signal can convey information by remaining high. Similarly, if the previously received bit was low, the signal can convey information by remaining low. The encoded bits can be recovered by determining which path is traversed during the symbol interval.

Note that if receiver 308 is a differential receiver, the previously received bit can be used to vary reference voltage 316 for receiver 308 so that receiver 308 is more sensitive to low-going transitions if the previous bit was low, and is more sensitive to high-going transitions if the previous bit was low. Alternatively, the previously received bit can be used to vary a threshold voltage for receiver 308 to achieve the same effect.

Delay Mechanism

Figure 4A:
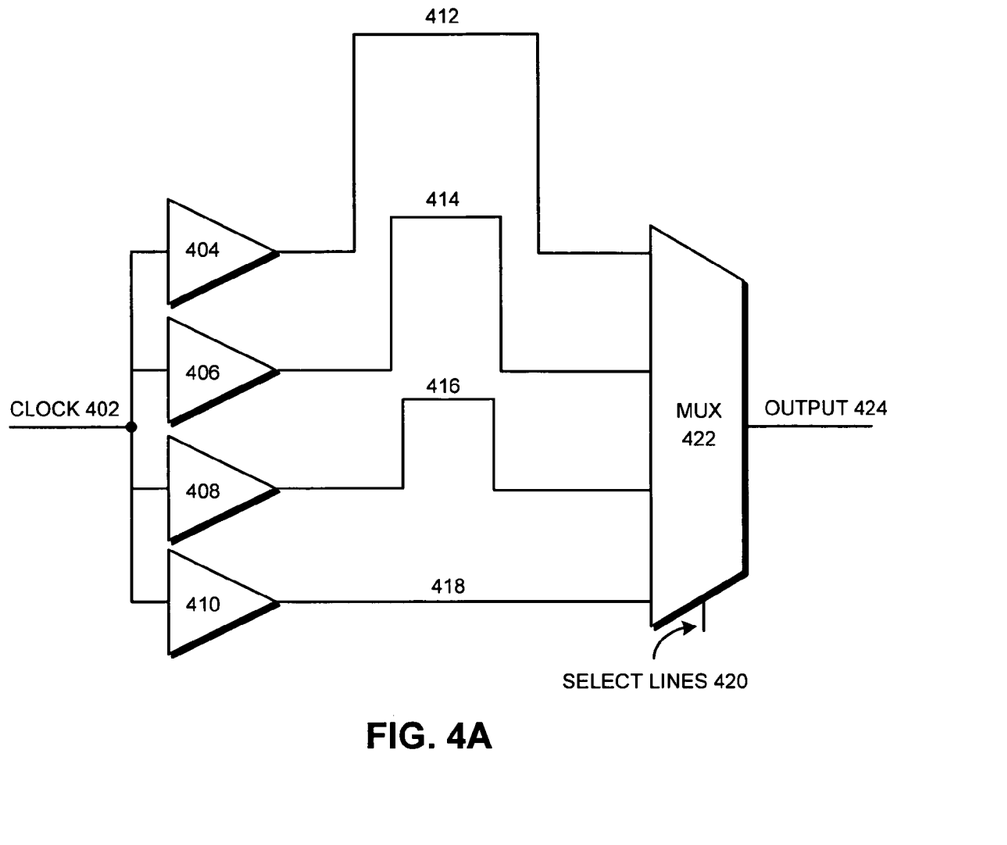
FIG. 4A presents a block diagram illustrating a delay mechanism in accordance with an embodiment of the present invention.

Encoding data within phase information in the symbol interval requires a delay mechanism. FIG. 4A presents a block diagram illustrating one possible delay mechanism in accordance with an embodiment of the present invention. It contains clock 402, buffer 404, buffer 406, buffer 408, buffer 410, delay line 412, delay line 414, delay line 416, delay line 418, select lines 420, MUX 422, and output 424.

Clock signal 402 is sent to buffers 404, 406, 408, and 410, which drive the clock signal through delay lines 412, 414, 416, 418, respectively. Delay line 410 is the longest delay line and therefore the clock signal through delay line 410 will arrive at MUX 422 last. Delay line 418 is the shortest delay line and therefore the clock signal through delay line 418 will arrive at MUX 422 first. Delay line 414 and delay line 416 are intermediate delay lines. Delay line 414 is longer than delay line 416, hence the clock signal through delay line 414 will arrive at MUX 422 after the clock signal through delay line 416. Both of these clock signals will arrive at MUX 422 between the clock signals on delay lines 410 and 418. Note that select lines 420 are used to select which delay to send to output 424.

Figure 4B:
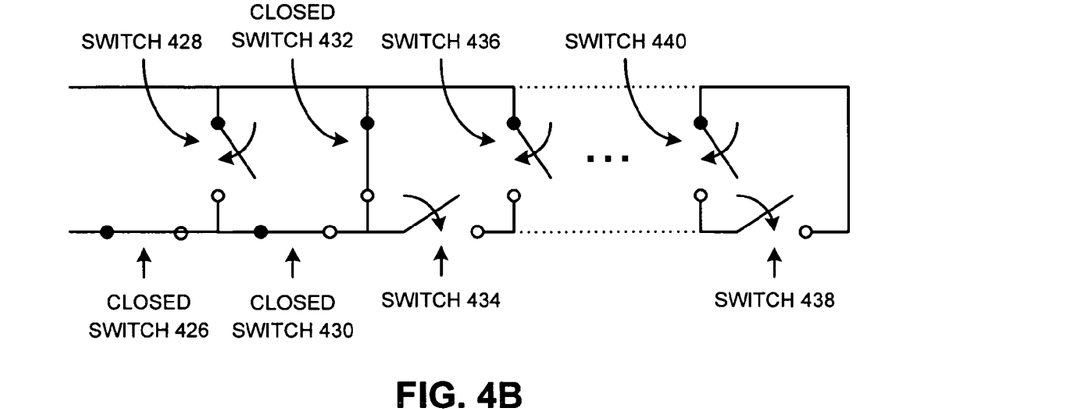
FIG. 4B presents a block diagram illustrating a delay mechanism in accordance with an embodiment of the present invention.

FIG. 4B presents a block diagram illustrating another possible delay mechanism in accordance with an embodiment of the present invention. It contains closed switch 426, switch 428, closed switch 430, closed switch 432, switch 434, switch 436, switch 438, and switch 440. A specific time delay is selected by closing one of the switches in the ladder, and also closing the corresponding crossbars to complete the signal path. In this example, the second ladder rung is closed (closed switch 432). To complete the signal path, the corresponding crossbars are closed (closed switch 426 and closed switch 430). More delay can be obtained by closing choosing a ladder rung farther out. For instance, switch 440, and the corresponding crossbars, can be closed to get a longer delay than shown in FIG. 4B. Note that other delay techniques can be used.

Receiving and Decoding Data

Figure 5:
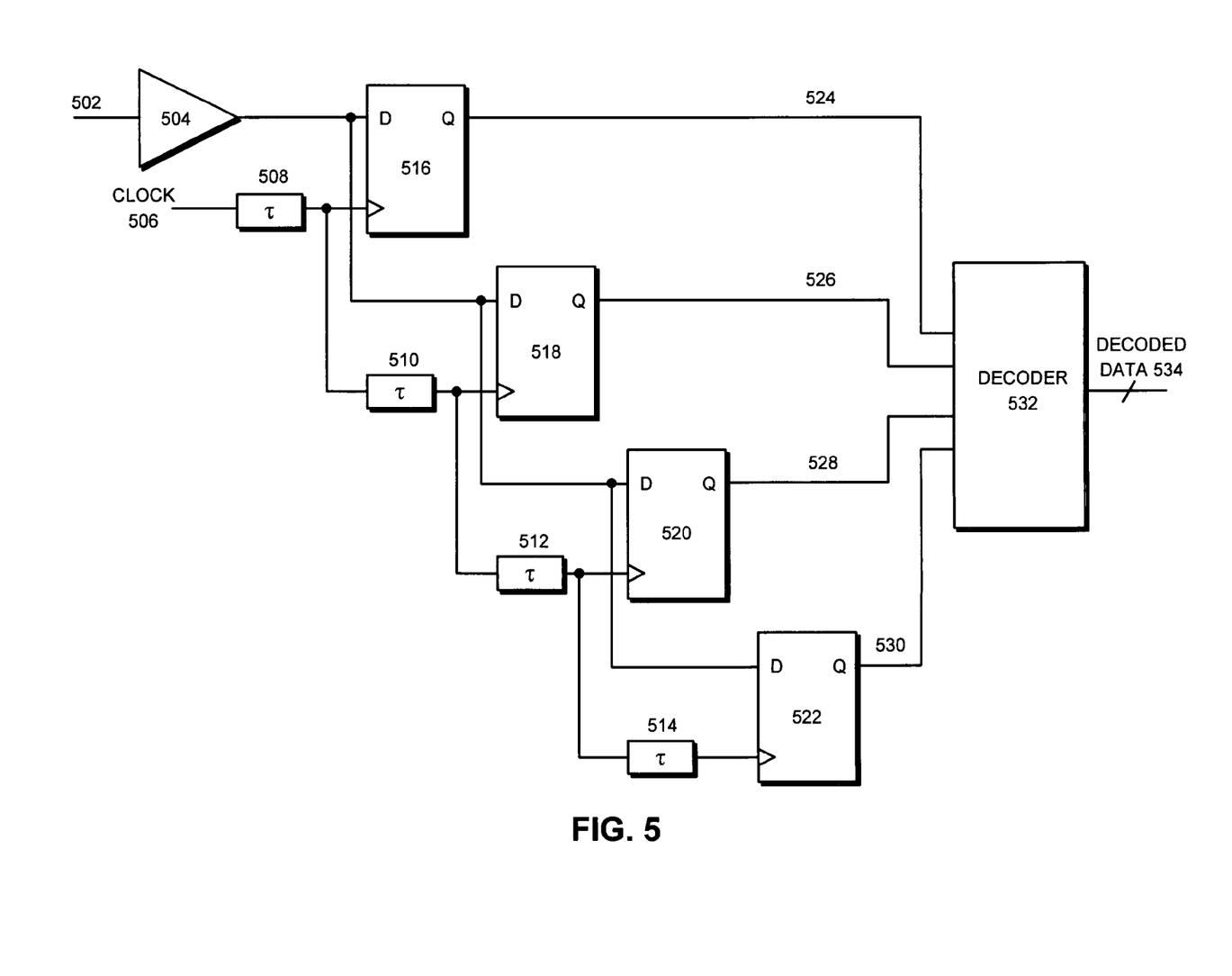
FIG. 5 presents a block diagram of a receiver and decoder in accordance with an embodiment of the present invention.

FIG. 5 presents a block diagram illustrating receiver 504 and decoder 532 in accordance with an embodiment of the present invention. More specifically, FIG. 5 illustrates receiver 504, delay element 508, delay element 510, delay element 512, delay element 514, flip-flop 516, flip-flop 518, flip-flop 520, flip-flop 522, signal 524, signal 526, signal 528, signal 530, decoder 532, and decoded data 534.

Receiver 504 receives signal 502 as an input and drives signal 502 to the data inputs of flip-flops 516, 518, 520, and 522. Clock signal 506 feeds through a chain of delay elements including: delay element 508, delay element 510, delay element 512, and delay element 514. The output of delay element 508 feeds into flip-flop 516. The output of delay element 510 feeds into flip-flop 518. The output of delay element 512 feeds into flip-flop 520. Finally, the output of delay element 514 feeds into flip-flop 522. Note that the output of each successive delay element delays the clock further. Therefore, the clock signal arrives at the clock input of flip-flop 516 first and arrives at the clock input of flip-flop 522 last.

The delayed clock signals cause the flip-flops to capture the state information of the signal at each discrete time period within the symbol interval. More specifically, flip-flop 516 stores the state of the signal in the first discrete time interval and outputs signal 524. Flip-flop 518 stores the state of the signal in the second discrete time interval and outputs signal 526. Flip-flop 520 stores the state of the signal in the first discrete time interval and outputs signal 528. Flip-flop 522 stores the state of the signal in the first discrete time interval and outputs signal 530.

Signals 524, 526, 528, and 530 feed into decoder 532. Decoder 532 receives these signals and produces decoded data 534. For instance, if the two-bit encoding scheme in FIG. 2A is used, the signal paths can be encoded such that signal path 202 is decoded as 00, signal path 204 is decoded as 01, signal path 206 is 10, and signal path 208 is decoded as 11.

To handle the case when the previously received bit was low, a replica of the circuitry in FIG. 5 is placed in parallel with the circuitry illustrated in FIG. 5. This replica is essentially the same as the circuitry illustrated in FIG. 5, except that it is configured to capture and decode low-going signals instead of high-going signals. The decoded data output from the replica and decoded data 534 are fed into a MUX. The state of the previously received bit is used to select which MUX input to route to the output of the MUX.

Figure 8:
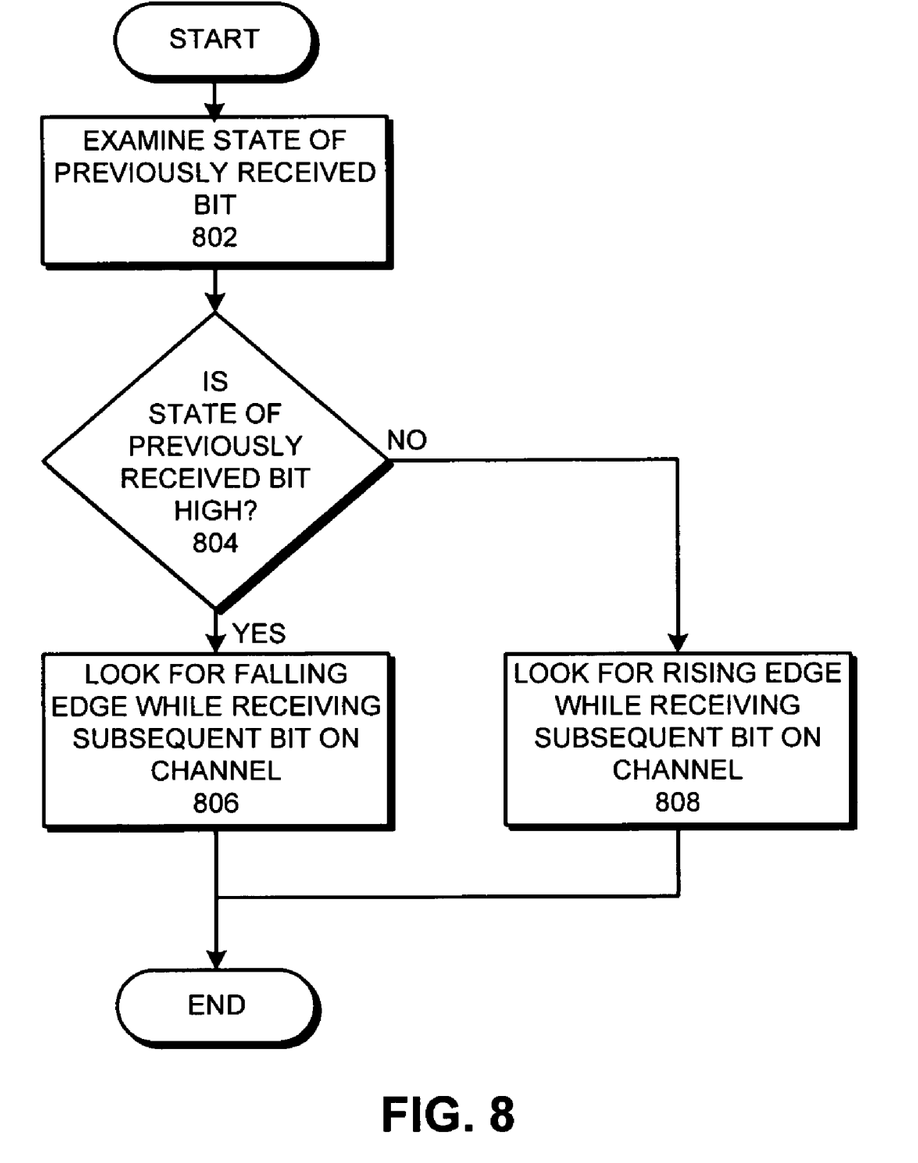
FIG. 8 presents a flow chart illustrating the process of receiving a signal from a communication channel in accordance with an embodiment of the present invention.

FIG. 8 presents a flow chart illustrating the process of receiving a signal from a communication channel in accordance with an embodiment of the present invention. The process begins when the decoder examines the state of a previously received bit (step 802). The decoder then determines if the state of the previously received bit is high (step 804). If so, the decoder looks for a falling edge while receiving a subsequent bit on the communication channel (step 806). Otherwise, the decoder looks for a rising edge while receiving a subsequent bit on the communication channel (step 808).

Encoding and Transmitting Data

Figure 6:
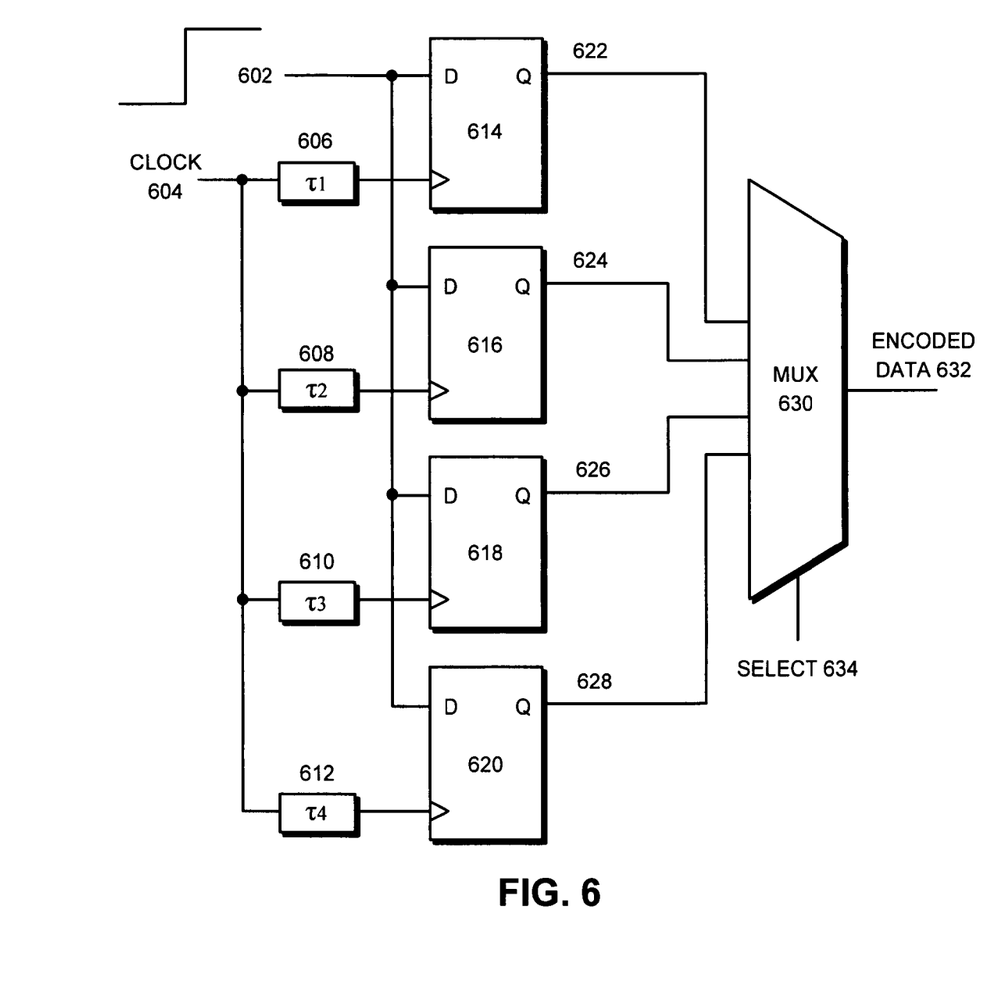
FIG. 6 presents a block diagram of an encoder in accordance with an embodiment of the present invention.

FIG. 6 presents a block diagram of an encoder in accordance with an embodiment of the present invention. It contains signal 602, clock signal 604, delay element 606, delay element 608, delay element 610, delay element 612, flip-flop 614, flip-flop 616, flip-flop 618, flip-flop 620, signal 622, signal 624, signal 626, signal 628, MUX 630, encoded data 632, and select line 634.

Signal 602 is fed into the data inputs of flip-flops 614, 616, 618, and 620. Clock 604 is coupled to delay elements 606, 608, 610, and 612. Note that delay elements 606, 608, 610, and 612 have different delays. Delay element 606 is the shortest delay, followed by delay element 608, delay element 610, and delay element 612. Hence, the clock signal arrives at the clock input of flip-flop 614 first. Next, the clock signal arrives at the clock input of flip-flop 616. Then, the clock signal arrives at the clock input of flip-flop 618. Finally, the clock signal arrives at the clock input of flip-flop 620.

The delayed clocks cause the flip-flops to output the transition at the desired phase in the symbol interval. Flip-flop 614 outputs the state of the signal in the first discrete time interval to signal 622. Flip-flop 616 outputs the state of the signal in the next discrete time interval to signal 624. Flip-flop 618 outputs the state of the signal in the next discrete time interval to signal 626. Finally, flip-flop 620 outputs the state of the signal in the next discrete time interval to signal 630.

Signals 622, 624, 626, and 628 feed into MUX 532. Select line 634 is used to select which signal should be routed to the MUX output to become encoded data 632. For instance, if the two-bit encoding scheme in FIG. 2B is used, the signal paths can be encoded such that signal path 220 is 00, signal path 222 is 01, signal path 224 is 10, and signal path 226 is 11. If signal path 222 is used to encode the data, select line 634 is set to select signal 624, which goes high at discrete time interval 230. Note that the input bit stream is used to create signal 602 and select line 634. The input bit stream feeds into a bit stream encoder (not shown) which generates the corresponding values for signal 602 and select line 634 in order to produce the corresponding phase encoded data (encoded data 634).

Figure 7:
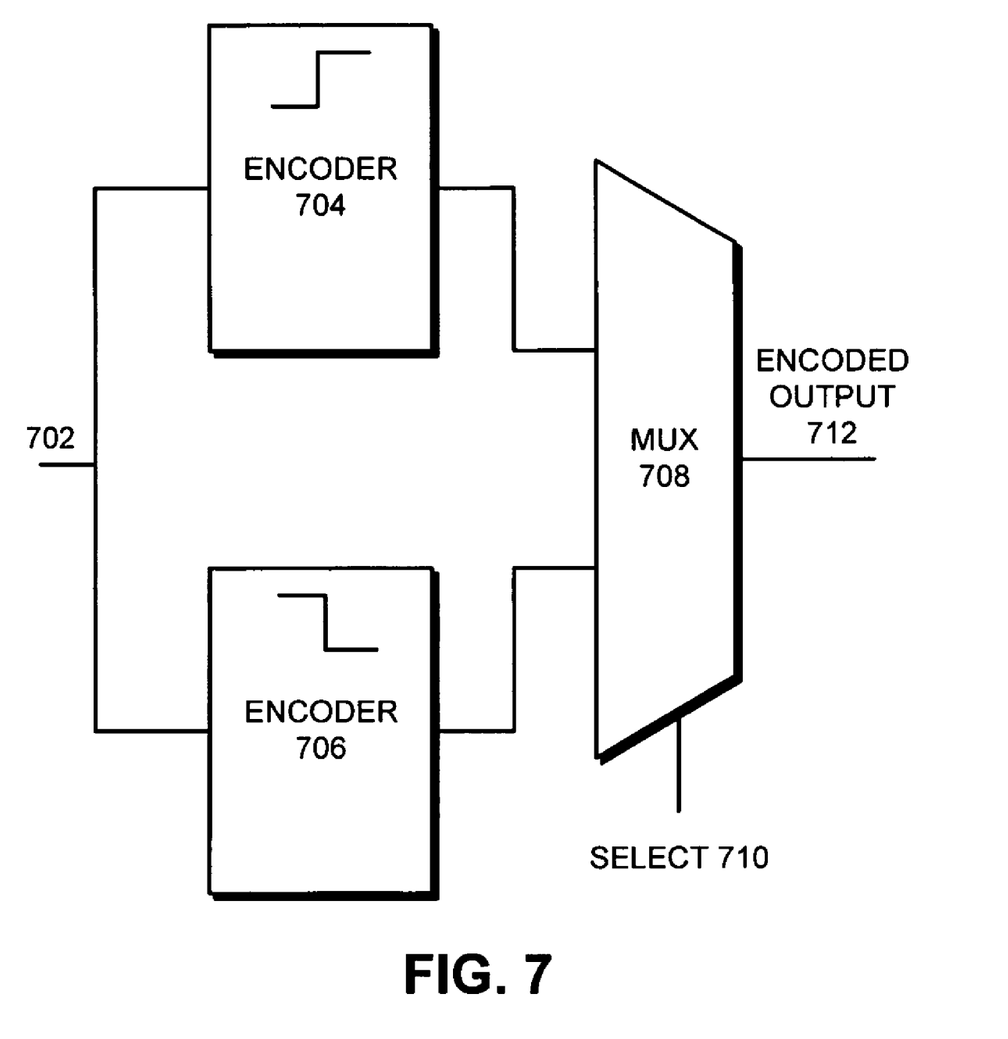
FIG. 7 presents a block diagram of both a rising edge and a falling edge encoder which are coupled together to encode data in accordance with an embodiment of the present invention.

FIG. 7 presents a block diagram of both a rising edge and a falling edge encoder which are coupled together to encode data in accordance with an embodiment of the present invention. It contains input 702, encoder 704, encoder 706, MUX 708, select line 710, and encoded output 712. Designs for encoder 704 and encoder 706 are described in more detail above with reference to FIG. 6. The only difference between the two encoders is that encoder 704 is a rising-edge encoder and encoder 706 is a falling-edge encoder. Signal 702 feeds into both encoder 704 and encoder 706 and both encoders produce an output. However, only one of these outputs is used. If the previously transmitted bit was high, rising-edge encoder 704 is not used because a falling edge is needed. Therefore, if the previously transmitted bit was high, the output of falling-edge encoder 706 will be routed to encoded output 712. Similarly, if the previously transmitted bit was low, the output of rising-edge encoder 704 will routed to encoded output 712. Select signal 710 is used to select which one of the encoders to use. Note that the value of select signal 710 is consistent with the previously transmitted bit stored in memory.

Figure 9:
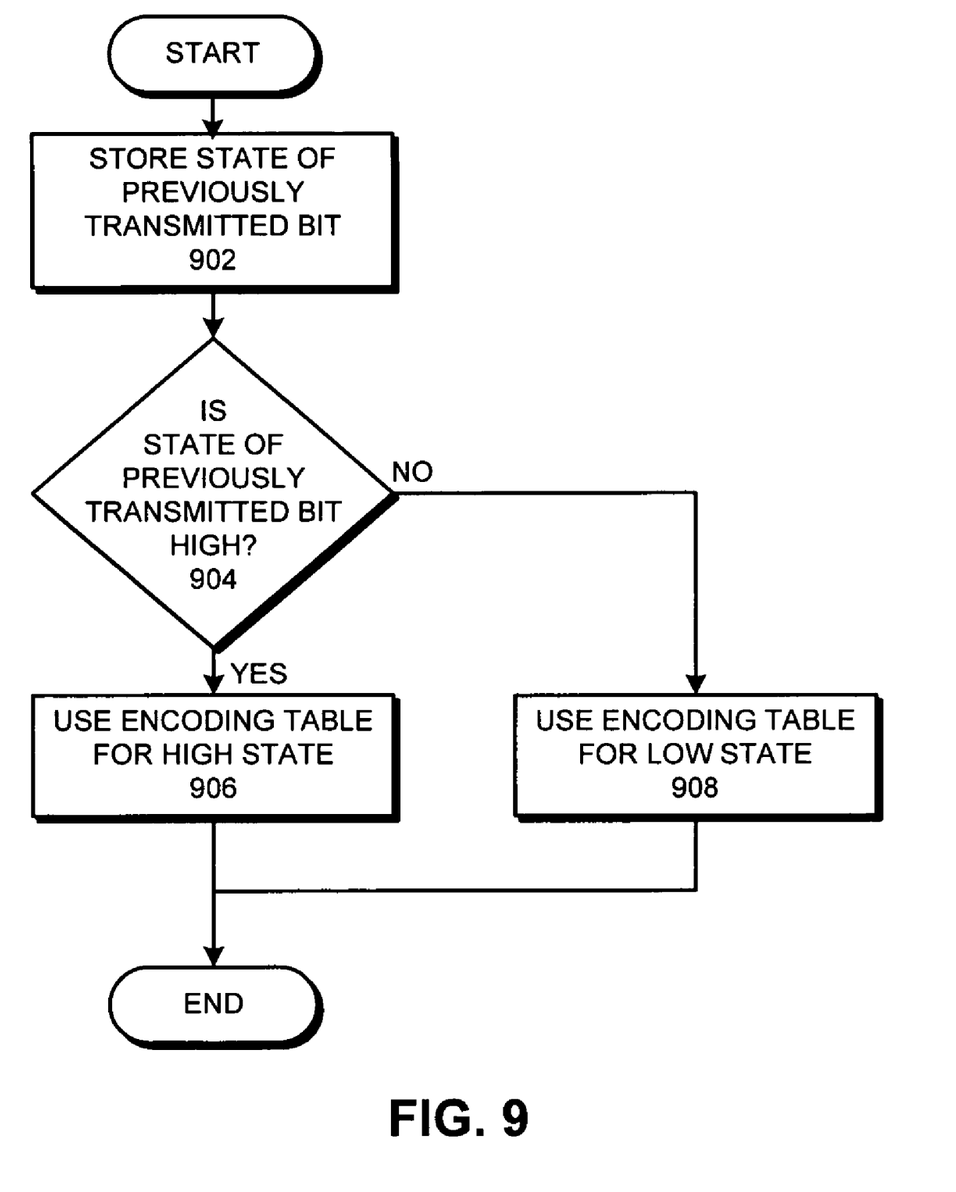
FIG. 9 presents a flow chart illustrating the process of encoding data for transmission in accordance with an embodiment of the present invention.

FIG. 9 presents a flow chart illustrating the process of encoding data for transmission in accordance with an embodiment of the present invention. The process begins when the encoder stores the state of a previously transmitted bit (step 902). The encoder then determines if the state of the previously transmitted bit is high (step 904). If so, the encoder uses an encoding table for a high state (step 906). Otherwise, the encoder uses an encoding table for a low state (step 908).

Note that the symbol interval does not need to include a transition for every state, because one state can be indicated by no transition.

Also note that not all encoded inputs require the same amount of time to be transmitted, because some encoded inputs are associated with signal transitions that happen sooner, whereas other encoded inputs are associated with signal transitions that happen later. As soon as the transition happens, the next symbol interval can start. The encoder and decoder can account for these variations of the transmission times to correctly encode and decode the data.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for encoding a signal for transmission on a channel and receiving data on the channel, comprising:
   using an encoder to:
      read the state of a previously transmitted bit;
      read a multi-bit value to be encoded;
      if the state of the previously transmitted bit is high,
         use an encoding table for a high state to select a discrete time step in a symbol interval which corresponds to the multi-bit value to be encoded, wherein the symbol interval specifies a time period during which a signal being used to transmit the symbol can change states; and
         cause a transition from high-to-low or cause the signal to remain high at the selected discrete time step; and
      otherwise, if the state of the previously transmitted bit is low,
         use an encoding table for a low state to select a discrete time step in the symbol interval which corresponds to the multi-bit value to be encoded, and
         cause a transition from low-to-high or cause the signal to remain low at the selected time step.

2. The method of claim 1, wherein after causing a transition from high-to-low or a transition from low-to-high, the method further comprises waiting for a minimum switching period before causing a subsequent transition.

3. The method of claim 1, wherein causing a transition from high-to-low or a transition from low to high at a selected discrete time step involves using a variable-delay circuit.

4. The method of claim 1, wherein receiving data on the channel involves:
   using a decoder to:
      examine a state of a bit that was previously received on the channel;
      if the state of the previously received bit was high, look for a falling edge while receiving a subsequent bit on the channel;
      otherwise, look for a rising edge while receiving the subsequent bit on the channel; and
      wherein looking for at least one of a rising edge or a falling edge involves sampling the signal at discrete time steps within the symbol interval.

5. The method of claim 4, wherein looking for a rising edge involves using a different reference voltage or threshold voltage from the reference voltage or threshold voltage used when looking for a falling edge.

6. The method of claim 4, wherein looking for a rising edge or a falling edge involves:
   sampling a signal on the channel at discrete time steps within a symbol interval, wherein the symbol interval specifies a time period during which the signal can change states;
   wherein the specific discrete time step at which the signal changes state is associated with a specific encoded input which in turn is decoded;
   wherein the signal can also convey information by not changing states; and
   wherein not all bit patterns require the same time to be transmitted.

7. The method of claim 4, wherein the symbol interval represents a bit pattern.

8. An apparatus for encoding a signal and receiving data on a channel, comprising:
   a transmitter with an encoder, wherein the encoder is configured to:
      read the state of a previously transmitted bit;
      read a multi-bit value to be encoded;
      if the state of the previously transmitted bit is high, to
         use an encoding table for a high state to select a discrete time step in a symbol interval which corresponds to the multi-bit value to be encoded, wherein the symbol interval specifies a time period during which a signal being used to transmit the symbol can change states; and
         cause a transition from high-to-low or cause the signal to remain high at the selected discrete time step; and
      otherwise, if the state of the previously transmitted bit is low, to
         use an encoding table for a low state to select a discrete time step in the symbol interval which corresponds to the multi-bit value to be encoded; and
         cause a transition from low-to-high or cause the signal to remain low at the selected time step.

9. The apparatus of claim 8, further comprising a receiver with a decoding mechanism, wherein the decoding mechanism is configured to:
   examine a state of a bit that was previously received on the channel;

if the state of the previously received bit was high, to look for a falling edge while receiving a subsequent bit on the channel;

otherwise, to look for a rising edge while receiving the subsequent bit on the channel;

wherein while looking for at least one of a rising edge or a falling edge, the decoder is configured to sample a signal on the channel at discrete time steps within the symbol interval.

10. The apparatus of claim 9, wherein while looking for a rising edge the decoding mechanism is configured to use a different reference voltage or threshold voltage from the reference voltage or threshold voltage that the decoding mechanism is configured to use when looking for a falling edge.

11. The apparatus of claim 9, wherein while looking for a rising edge or looking for a falling edge, the decoder is configured to:

sample a signal on the channel at discrete time steps within a symbol interval, wherein the symbol interval specifies a time period during which the signal can change states;

wherein the specific discrete time step at which the signal changes state is associated with a specific encoded input which in turn is decoded;

wherein the signal can also convey information by not changing states; and wherein not all bit patterns require the same time to be transmitted.

12. The apparatus of claim 9, wherein the symbol interval represents a bit pattern.

13. The apparatus of claim 8, wherein after causing a transition from high-to-low or a transition from low-to-high, the encoder is configured to wait for a minimum switching period before causing a subsequent transition.

14. The apparatus of claim 8, wherein causing a transition from high-to-low or a transition from low to high at a selected discrete time step involves using a variable delay circuit.

15. A computer system for receiving data on a channel, comprising:

a processor;

a memory;

a transmitter with an encoder, wherein the encoder is configured to:

read the state of a previously transmitted bit;

read a multi-bit value to be encoded;

if the state of the previously transmitted bit is high, to use an encoding table for a high state to select a discrete time step in a symbol interval which corresponds to the multi-bit value to be encoded, wherein the symbol interval specifies a time period during which a signal being used to transmit the symbol can change states; and cause a transition from high-to-low or cause the signal to remain high at the selected discrete time step; and otherwise, if the state of the previously transmitted bit is low, to use an encoding table for a low state to select a discrete time step in the symbol interval which corresponds to the multi-bit value to be encoded; and cause a transition from low-to-high or cause the signal to remain low at the selected time step.

16. The computer system of claim 15, further comprising a receiver with a decoding mechanism, wherein the decoding mechanism is configured to:

examine a state of a bit that was previously received on the channel;

if the state of the previously received bit was high, to look for a falling edge while receiving a subsequent bit on the channel;

otherwise, to look for a rising edge while receiving the subsequent bit on the channel;

wherein while looking for at least one of a rising edge or a falling edge, the decoder is configured to sample a signal on the channel at discrete time steps within the symbol interval.

17. The computer system of claim 16, wherein while looking for a rising edge, the decoder is configured to use a different reference voltage or threshold voltage than the reference voltage or threshold voltage that the decoder is configured to use when looking for a falling edge.

18. The computer system of claim 16, wherein while looking for a rising edge or looking for a falling edge, the decoder is configured to:

sample a signal on the channel at discrete time steps within a symbol interval, wherein the symbol interval specifies a time period during which the signal can change states;

wherein the specific discrete time step at which the signal changes state is associated with a specific encoded input which in turn is decoded;

wherein the signal can also convey information by not changing states; and wherein not all bit patterns require the same time to be transmitted.

19. The computer system of claim 16, wherein the symbol interval represents a bit pattern.

20. The computer system of claim 15, wherein after causing a transition from high-to-low or a transition from low-to-high, the encoder is configured to wait for a minimum switching period before causing a subsequent transition.

21. The computer system of claim 15, wherein causing a transition from high-to-low or a transition from low to high at a selected discrete time step involves using a variable delay circuit.

* * * * *

UNITED STATES PATENT AND TRADEMARK OFFICE
CERTIFICATE OF CORRECTION

PATENT NO. : 7,668,244 B2 Page 1 of 1
APPLICATION NO. : 11/172332
DATED : February 23, 2010
INVENTOR(S) : William P. Cornelius It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1274 days.

Signed and Sealed this

Seventh Day of December, 2010

David J. Kappos
*Director of the United States Patent and Trademark Office*